United States Patent Office 3,430,305
Patented Mar. 4, 1969

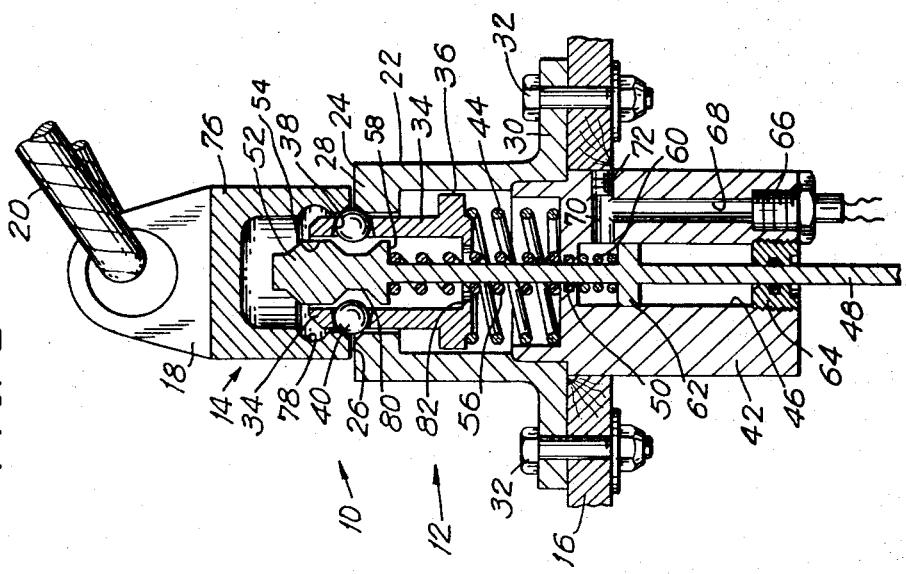
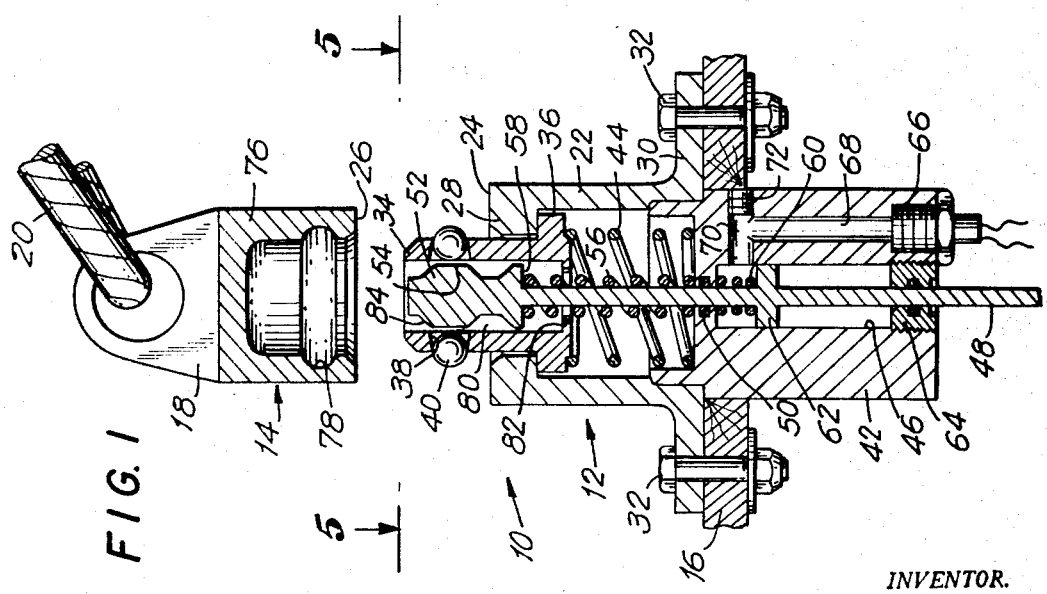

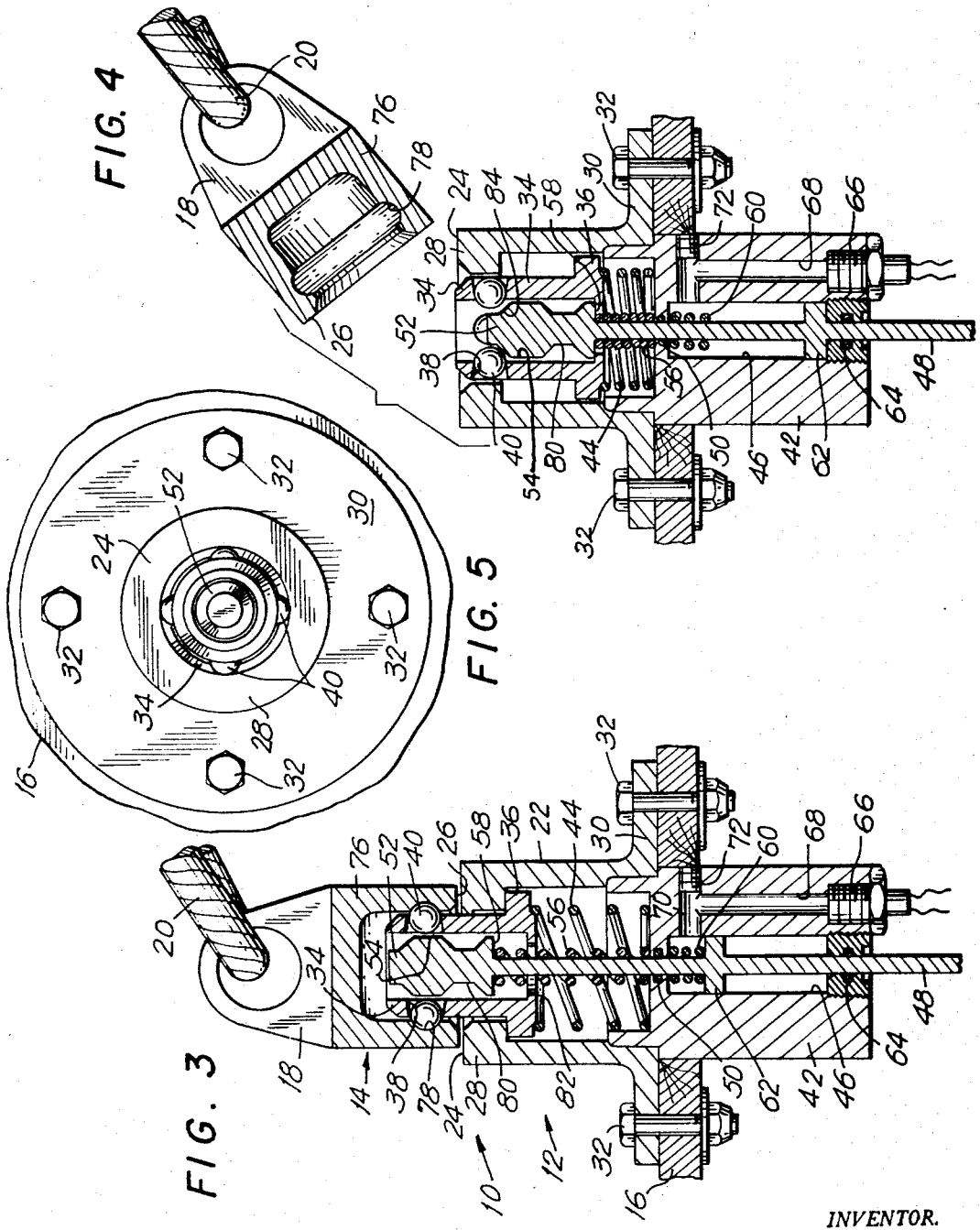

3,430,305
RELEASABLE CONNECTORS
Ted Geffner, 48 Park Ave. E.,
Merrick, N.Y. 11566
Filed May 19, 1967, Ser. No. 639,853
U.S. Cl. 24—211                                    11 Claims
Int. Cl. B66f 11/00; B66c 1/10

ABSTRACT OF THE DISCLOSURE

A releasable connector structure for releasably connecting entities such as a boat and a dock to which it is moored, an aircraft and the ground, a spaceship and its launching pad, and the like. The releasable connector has a pair of connector units which are respectively attached to the entities and which are releasably locked to each other in order to connect the entities together. The locking of the connector units to each other is brought about by way of movable lock members, such as spheres, received in a groove of one connector unit and held in the latter by a piston slidable in the other connector unit. A retracting means of this other unit can be retracted so as to release the spheres for movement out of the groove, and thus it becomes possible to disconnect the connector units from each other. The retracting means for retracting the piston which holds the locking spheres in their groove can be either manually or explosively actuated.

Background of the invention

As is well known, when a boat arrives at a suitable dock, or when an airplane is to remain at a given location in an air field, it is necessary to releasably tie the craft of whatever type to its mooring structure. Conventionally this is done by way of ropes or the like which are wound around cleat moving posts, and the like. However, with this conventional arrangement, when the craft is to be cast off from its mooring, considerable time and labor are required to unwind the ropes from the cleats and to disconnect the craft from its mooring. If the craft is already under way, before it is completely disconnected from its mooring, the result may be unavoidable collision with other craft and the dock.

Summary of the invention

It is accordingly a primary object of the present invention to provide a construction which will enable a craft of the above type or other entities to be releasably connected in a reliable manner with moorings or other entities, while at the same time making it possible to provide substantially instantaneous release of the connection of the entities to each other so that in the case of a craft such as a boat or airplane, the latter can be substantially instantaneously freed from its mooring, thus avoiding all of the above drawbacks.

A further object of the present invention is to provide a structure of this type which can be manually actuated.

Also, it is an object of the invention to provide a structure of this type which can be explosively actuated.

Furthermore, it is an object of the present invention to provide a structure of this type which can be manually or explosively actuated at the option of the operator.

Also, it is an object of the present invention to provide a structure which will accomplish the above objects while at the same time being composed of simple rugged elements which are very reliable in operation, which are easy to set up as by mounting on suitable structures, and which at the same time are relatively inexpensive so that amateur boat enthusiasts, for example, can avail themselves of the present invention without excessive expenditure.

Primarily, with the structure of the invention the pair of connector units which form the connector are adapted to be attached to the entities which are to be connected to each other releasably, and one of these connector units has an outer sleeve provided with an end face which is situated adjacent and directed toward an end face of a tubular portion of the other unit when these connector units are connected to each other. This outer sleeve slidably guides, telescopically within its interior, an inner sleeve which has a forward end position projecting forwardly beyond the end face of the outer sleeve, and this inner sleeve has a wall portion formed with an opening situated forwardly beyond the end face of the outer sleeve when the inner sleeve is in its forward end position. A lock member is freely movable in this opening between an outer locking position and an inner release position, and a piston is slidable within the inner sleeve and has an exterior surface portion which in an axial position of rest of the piston is situated in the region of the opening of the inner sleeve to maintain the lock member in its outer locking position. An inner spring means coacts with the piston to yieldably maintain the latter in its axial position of rest while at the same time yieldably coacting with the piston to release the latter both for movement forwardly and rearwardly of its axial position of rest, and an outer spring means coacts with the inner sleeve, urging the latter forwardly to its forward end position, this other spring means being stronger than the inner spring means. The piston is formed forwardly and rearwardly of its exterior surface portion with forward and rear recesses for respectively receiving the lock member when it is in its inner release position. Finally, the inner sleeve has an inner flange, situated in the path of rearward movement of the piston when the latter is displaced rearwardly beyond its axial position of rest, to be engaged by the piston, which then will move the inner sleeve together with the piston during retraction of the latter.

The other of the connector units has an elongated tubular portion terminating in an end face which is situated adjacent and directed toward the end face of the outer sleeve when this other connector unit is locked to the one connector unit, and this tubular portion is formed inwardly of its end face with a lock recess situated from the end face of the tubular portion by a distance less than the distance between the locked member and the end face of the outer sleeve when the inner sleeve is in its forward end position, so that the lock member can be received in the inner locking recess of the tubular portion of the other connector units to releasably lock the latter with the one connector unit. A retracting means coacts with the piston for retracting the latter rearwardly from its axial position of rest to release the lock member for movement into the forward recess of the piston when the latter together with the inner sleeve are retracted rearwardly, thus releasing the other connector unit from the one connector unit so that in this way the entities can be released from each other.

Brief description of the drawings

The invention is illustrated by way of example in the accompanying drawings which form part of this application and in which:

FIG. 1 is a sectional elevation of one possible embodiment of a structure according to the invention, showing the connector units as they are located with respect to each other when they are about to be connected together;

FIG. 2 shows the structure of FIG. 1 at an intermediate stage during the fastening of the connector units to each other;

FIG. 3 shows the connector units locked to each other;

FIG. 4 shows how the retracting means operates to release the connector units for separation from each other; and FIG. 5 is a fragmentary plan view taken along line 5—5 of FIG. 1 in the direction of the arrows to illustrate the circular configuration of the components of the structure of the invention.

*Description of a preferred embodiment*

Referring now to the drawings, as may be seen from FIG. 1, the connector 10 of the present invention has a pair of connector units 12 and 14. These units are adapted to be connected to each other, releasably interconnecting a pair of entities. For example, the connector unit 12 is shown fixed to the deck 16 of a boat or other vessel, although the wall 16 could equally well be the fuselage of an aircraft or spaceship, for example. The connector unit 14 is provided with an eye 18 integrally fixed with the remainder of the connector unit 14 and capable of having a line 20 passed therethrough, this line being connected to a mooring post of any type. Thus, the entity which has the deck 16 can be attached to the entity which has the mooring post through the connector units 12 and 14 of the connector 10 when these connector units are releasably locked to each other in a manner described below. Thus, the structure of the invention has for the connector 10 the pair of connector units 12 and 14 which are respectively adapted to be attached to the entities which are to be releasably connected to each other.

The connector unit 12 has an outer sleeve 22 terminating in an outer end face 24 which is situated adjacent and directed toward the end face 26 of the unit 14 when the connector units 12 and 14 are locked to each other. This outer sleeve 22 has an inwardly directed flange 28 at the region of its outer end face 24. At its rear end the sleeve 22 has an outwardly directed flange 30 for receiving the fasteners 32 by which the structure is fastened to the deck 16 or the like, and all of the structure is circular in cross section, as is apparent from FIG. 5. Each fastener unit 32 may be in the form of a simple bolt and nut assembly which may be provided with suitable washers, for example.

The connector unit 12 includes, in addition to its outer sleeve 22, an inner sleeve 34 provided at its rear end with an outwardly directed flange 36 engaging the inwardly directed flange 28 of the outer sleeve 22, so as to limit the inner sleeve 34 to forward movement with respect to the outer sleeve 22 to the forward end position thereof, shown in FIG. 1, at which the sleeve 34 extends forwardly beyond the end face 24.

A wall portion of the sleeve 34 which is situated forwardly beyond the end face 2 when the inner sleeve 34 is in its forward end position is formed with an opening 38 which receives a freely movable lock member 40 which is radially movable between the outer locking position shown in FIG. 1 and an inner release position shown in FIG. 4. Actually, the sleeve 34 is formed with a plurality of openings 38 distributed about its axis which is common with the axis of the sleeve 22, and a plurality of the lock members 40 are respectively received in the openings 38. These lock members 40 are in the form of spherical ball members, and the outer edges of the cylindrical openings 38 in which the ball members 30 are freely movable are directed inwardly so as to limit the extent to which the ball members 40 can move outwardly. In this way, while the ball members 40 can move to their outer locking positions they are retained reliably within the openings 38 for free radial movement therein. These openings 38 can simply be made tapered so that their outer ends have diameters less than the diameters of the ball members 40 while the inner ends of the openings 38 are of larger diameters than the diameters of the ball member 40, so that the latter are freely movable in the openings 38 but cannot move out of the latter.

The sleeve 22 has fixedly connected thereto a rear block 42 the front surface of which engages the rear end of an outer spring means 44 which engages the sleeve 34 in order to displace the latter forwardly to its forward end position shown in FIG. 1. The block 42 is formed to the rear of the spring means 44 with a hollow cylinder 46 and between the cylinder 46 and the interior of the outer sleeve 22 the block 42 has an inwardly directed flange which slidably surrounds and engages a piston rod 48, this flange carrying a suitable sealing gland 50 which provides for a fluid-tight slidable guiding of the piston rod 48 for a purpose described below.

The piston rod 48 is fixed at its forward end to a forward piston 52 having an exterior annular surface 54 which covers the openings 38 in the axial position of rest of the piston 52 which is shown in FIG. 1, so that at this time the piston 52 retains the lock members 40 in their outer locking positions.

An inner spring means coacts with the piston 52 for releasably and yieldably maintaining the latter in its axial position of rest, this inner spring means being weaker than the outer spring means 44 and yielding in both directions to release the piston 52 for movement both forwardly and rearwardly from its axial position of rest which is shown in FIG. 1. The inner spring means includes a forward spring 56 coiled about the piston rod 48 between the rear face 58 of the piston 52 and the front end surface of the block 42, and the inner spring means includes a rear spring 60 having a front end engaging the rear surface of the part of the block 42 which carries the sealing gland 50 and a rear end engaging a second or rear piston 62 which is fixed to the piston rod 48 and which is slidable within the cylinder 46. The cylinder 46 carries at its outer end a plug 64 which is axially bored to guide the piston rod 48 and which also carries a suitable sealing gland.

The piston rod 48 can be manually retracted by any suitable unillustrated structure. However, it is possible also to operate the structure with an explosive force. For this purpose the block 42 removably carries an explosive squib 66 of a known structure which is connected into an electrical circuit which when closed will ignite the squib 66 so as to release the explosive charge thereof. The block 42 is formed with a passage means which includes a passage 68 extending from the squib 66 which is releasably threaded within a suitable bore of the block 42. The passage 68 communicates at its forward end with a passage 70 leading into the cylinder 46 at the forward side of the rear piston 62, and the block 42 is provided with a plug 72 closing the block at the junction between the passages 68 and 70 of the passage means which directs the explosive charge from the squib 66 into the cylinder 46 forwardly of the piston 62 therein. Thus, if the operator decides to actuate the device explosively rather than manually, he need only close the circuit to the squib 66 to ignite the latter and direct the explosive charge against the piston 62 to retract the latter together with the rod 48 and the forward piston 52.

The other connector unit 14 includes an elongated tubular portion 76 terminating in the end face 26 referred to above. The connector unit 14 is substantially of cup-shaped configuration and has a forward end wall closing the tubular portion 76 and integrally formed with and integrally carrying the eye 18 which was also referred to above.

Forwardly of its end face 26, the tubular portion 76 is formed at its inner surface with an annular recess 78 for receiving the lock members 40, and the distance of the recess 78 from the end face 26 is no greater than the distance between the lock member 40 and the end face 24 when the sleeve 34 is in its forward end position shown in FIG. 1.

Assuming that a craft or other entity which carries the connector unit 12 has arrived at a suitable dock or the like to be releasably attached to a mooring post thereof, for example, then the operator need only displace the connector unit 14 onto the inner sleeve 34 of the unit 12.

For this purpose the tubular portion 76 will be advanced telescopically around the sleeve 34 so that the end face 26 will engage the lock member 40, the inner diameter of the tubular portion 76 being substantially equal to the outer diameter of the inner sleeve 34. Thus, the engagement of the end face 26 with the lock members 40 will result in rearward displacement of the inner sleeve 34 in opposition to the force of the spring means 44. The piston 52 is formed rearwardly of its exterior surface 54 with an annular rear recess 80 which is situated, when the piston 52 is in its axial position of rest, forwardly of the end face 24 by a distance sufficient to receive the lock members 40 during rearward movement of the latter together with the sleeve 34. Therefore, as the unit 14 displaces the sleeve 34 rearwardly the ball members 40 will reach the recess 80 to be displaced into the latter while the end face 26 engages the end face 24.

The ball members 40 will now enter into the rear recess 80 of the forward piston 52 so that the parts will assume the position shown in FIG. 2, and now the compressed spring means 44 can expand to displace the sleeve 34 forwardly back towards its forward position of rest, and because the piston 52 is locked at this time to the sleeve 34 by the lock members 40, the piston 52 will also be displaced forwardly beyond its axial position of rest shown in FIG. 1, in opposition to the rear spring 60 of the inner spring means 56, 60.

When the flange 36 engages the flange 28, so as to limit the forward movement of the inner sleeve 34, the lock members 40 will have already been received in the recess 78, the spring 60 expanding at this time to displace the piston 52 back to its position of axial rest where its exterior surface 54 retains the ball members 40 in the recess 78, and the parts are shown in this locked position in FIG. 3.

When the connection is to be released, the piston rod 48 will be retracted by the retracting means of the invention, either manually or explosively. The result of the actuation of the retracting means is that the rear surface 58 of the forward piston 52 is displaced rearwardly in opposition to the spring 56 of the inner spring means 56, 60, and during its rearward movement this rear surface 58 of the piston 52 engages an inwardly directed flange 82 situated at the rear of and integral with the inner sleeve 34, so that this flange 82, which is in the path of rearward movement of the piston 58, causes the sleeve 34 to become retracted with the piston 52. The result is that when the surface 58 engages the flange 82, a forward annular recess or depression 84, which is formed in the piston 52 forwardly of its surface 54, becomes aligned with the movable lock members 40, which are thus capable of being received in this forward recess 84, and thus when the surface 58 engages the flange 82 the recess 84 is aligned with the lock members 40, and then during the rearward movement of the sleeve 34 in opposition to the spring 44 the ball member 40 will be displaced by the inner surface of the connector unit 14 into the recess 84 so that the unit 12 becomes disconnected from the unit 14. The sleeve 34 is retracted to the position shown in FIG. 4, where it is located substantially entirely within the outer sleeve 22, thus making the outer connecting unit 14 separable from the unit 12 in all radial directions in a highly reliable and substantially instantaneous manner.

Upon release of the retracting means the spring structure will return the parts to the position of FIG. 1.

Thus, with the structure of the invention, the operator of a boat, for example, can provide for substantially instantaneous release of the boat from its mooring by actuation of a suitable control at the control panel of the boat. The structure may be actuated by a knob at the control panel so that the skipper, who may be alone on a boat, can cast off whenever desired and all that is required is to open the throttle and pull the knob so as to provide for the release of the vessel from its mooring. It is completely unnecessary to climb onto the deck of the vessel and to unfasten lines and then dash back to the wheel. As a result, the possibility of collision with other boats and with the dock itself is eliminated. Even a one-man operated boat can be constantly controlled in a highly reliable manner throughout the cast-off cycle. Of course, it is a simple matter to actuate a plurality of the connectors 10 of the invention from a single manually operable control at a control panel, if desired.

Also, it is possible to use the explosive actuation by way of the squib 66, and in this case it is only necessary to close a switch so as to set off the squibs and thus provide for the explosive-actuated release of the connection. Then it is only necessary to replace the burnt out squibs with fresh squibs, which can be done after the vessel is under way.

The structure of the invention is extremely simple and rugged and can simply be made of brass which may be suitably chromed.

The structure includes only two units one attached to one entity, such as to the deck of a boat or to the fuselage of an aircraft, while the other can be tied by a suitable line to a mooring post or the like. All that is required is to fasten the unit 12 to the deck 16 or the like by way of the fasteners 32 which are in the form of simple bolts and nuts, and with respect to the other unit 14 it is only required to pass the line 20 through the eye 18 and to knot the line 20 suitably. Thus, the mounting of the connector units 12 and 14 of the connector 10 on the entities which are to be releasably connected to each other can take place very quickly and can be carried out by any lay person.

The piston rod 48 may take the form of a suitable flexible cable which is guided around suitable pulleys and the like to the instrument panel.

When the boat is docked, for example, it is a simple matter to quickly and conveniently snap the units 12 and 14 together to replace the connection.

When a plurality of the connectors 10 of the invention are used on a single vessel or other entity, they may all be separately controlled or they may all be synchronized for simultaneous operation. The structure is designed so that the line 20 has the critical strength. In other words, the structure is designed so that the line 20 will snap before the structure of the invention will break. The line 20 can be directed at any angle for complete release because of the retraction of the inner sleeve 34 substantially entirely within the outer sleeve 22, as shown in FIG. 4, so that there are no projecting components to interfere with the direction of movement of the connector unit 14 with respect to the connector unit 12 when disconnected from the latter.

What is claimed is:
1. A connector for releasably connecting a pair of entities to each other, comprising a pair of connector units respectively having end faces directed toward and located adjacent to each other when said units are connected to each other, said units being respectively attachable to the entities which are to be releasably interconnected and one of said connector units including an outer sleeve having said end face of said one unit, an inner sleeve axially slidable within said outer sleeve, said sleeves respectively having overlapping flanges which engage each other to limit the movement of said inner sleeve outwardly of said outer sleeve to a forward end position where said inner sleeve projects forwardly beyond said end face of said outer sleeve, said inner sleeve having a wall portion situated forwardly beyond said outer sleeve when said inner sleeve is in said forward end position thereof and formed with an opening passing through said wall portion, a lock member freely movable within said opening for radial movement toward and away from the common axis of said sleeves, said lock member being radially displaceable in said opening between an outer locking position projecting outwardly beyond the exterior surface of said inner sleeve and an inner release position projecting inwardly beyond an inner surface of said inner sleeve, a piston slidable within said inner sleeve and having an axial position of rest where an exterior surface portion of said piston which engages the interior surface of said inner sleeve is located in the region of said opening thereof for maintaining said lock member in its outer position, said piston being formed both forwardly and rearwardly of said exterior surface portion thereof with a pair of recesses for respectively receiving said lock member when the latter is displaced inwardly to its inner position, inner spring means operatively connected with said piston for yieldably maintaining the latter in said axial position of rest thereof while yielding during displacement of said piston both forwardly and rearwardly of said axial position of rest, outer spring means stronger than said inner spring means and operatively coacting with said inner sleeve for urging the latter to said forward end position thereof with respect to said outer sleeve, the other of said connector units having an elongated tubular portion terminating at one end in said end face of said other unit which is situated adjacent and directed toward said end face of said one unit when said units are releasably connected to each other, said tubular portion of said other unit being formed inwardly of said end face thereof, at an inner surface of said tubular portion, with a recess for receiving said lock member when the latter is displaced to its outer position by said exterior surface portion of said piston, and the distance of said lock member from said end face of said one unit when said inner sleeve thereof is in its forward end position being at least as great as the distance of said inner recess of said tubular portion of said other unit from the end face of the latter, and said inner surface of said other unit having a diameter approximately equal to the outer diameter of said inner sleeve of said one unit, said rear recess of said piston being situated in the axial position of rest of said piston forwardly of said end face of said outer sleeve to receive said lock member, and retracting means operatively connected with said piston for retracting the latter rearwardly from its position of axial rest, and said inner sleeve of said one unit having an inner flange situated in the path of rearward movement of said piston during retraction thereof by said retracting means to be engaged by said piston so that said retracting means acts through said piston on said inner sleeve to retract the latter in opposition to said outer spring means rearwardly together with said piston while said forward recess of the latter is situated to receive said lock member upon inward displacement of the latter towards its inner position, said retracting means retracting said inner sleeve and said piston therewith to a location where said piston is situated substantially entirely within said inner sleeve and said inner sleeve is situated substantially entirely within said outer sleeve, so that said other unit is then freely separable in all directions from said one unit.

2. The combination of claim 1 and wherein said retracting means is manually operable.

3. The combination of claim 1 and wherein said retracting means is explosively actuated.

4. The combination of claim 1 and wherein said retracting means is both manually operable and explosively actuated.

5. The combination of claim 1 and wherein said retracting means is explosively actuated and includes a rod extending from said piston and carrying a second piston rearwardly of said first-mentioned piston, a cylinder in which said second piston is slidable, and explosive unit, and passage means providing communication between said explosive unit and a forward face of said second piston which is directed forwardly toward said first-mentioned piston, so that upon actuation of said explosive unit the explosive gases will travel through said passage means to engage said forward face of said second piston and retract the latter together with said first-mentioned piston.

6. The combination of claim 1 and wherein said lock member is in the form of a sphere.

7. The combination of claim 6 and wherein said inner sleeve is formed with a plurality of openings distributed about its axis and situated at the same elevation as the first-mentioned opening, all of said openings respectively receiving spheres which are freely movable therein between said inner and outer positions, and said piston being formed with a rear annular groove situated to the rear of said exterior surface thereof and forming said rear recess and with a forward annular depression forming said forward recess and situated forwardly of said exterior surface thereof, said exterior surface of said piston itself being of cylindrical configuration, and said inner recess of said tubular portion of said other unit being in the form of an annular groove for receiving said spheres.

8. The combination of claim 1 and wherein said outer sleeve of said one connector unit terminates in a rear end provided with an otuwardly directed flange carrying fasteners for fastening said outer sleeve fixedly to one of said entities.

9. The combination of claim 1 and wherein said other connector unit is in the form of a cup-shaped member having said elongated tubular portion and carrying distant from said elongated portion an eye through which a line or the like may pass to connect said other unit to one of the entities.

10. The combination of claim 8 and wherein said other connector unit is in the form of a cup-shaped member having said elongated tubular portion and terminating distant therefrom in an eye through which a line may pass to connect said other connector unit to the other of the entities.

11. A connector for releasably connecting a pair of entities to each other, comprising a pair of connector units respectively attachable to the entities and means coacting with said units for connecting them to each other and for releasing said units one from the other in a manner providing clear breakaway of the units radially in all directions one with respect to the other, the connector unit attachable to one entity including a housing, a lock carrier sleeve movable axially inward and outward with respect to said housing, at least one lock member movable radially into and out of positions projecting from said lock carrier sleeve, and a cam movable axially in said carrier, the cam having a high surface adapted to force the lock member to a projecting position and low surfaces each side of said high surface adapted to permit retraction of the lock member out of said projecting position, the portion of said sleeve carrying said lock member being spring biased outwardly with respect to said housing and being movable inwardly, said cam being spring biased into a position holding the lock member in projecting position, and the connector unit attachable to the other entity including a portion adapted to engage the lock member to move the lock carrier sleeve axially inward with respect to the housing and the cam, and a portion adapted to be engaged by the lock member when said member has been moved radially inward by the lock carrier sleeve and radially outward by the cam.

References Cited

UNITED STATES PATENTS 3,052,940 9/1962 Sellers.
3,085,462 4/1963 Myers _____ 24—211 X
3,233,496 2/1966 De Pew _____ 24—211 X
3,065,011 11/1962 De Pew _____ 287—119

BERNARD A. GELAK, *Primary Examiner.*

U.S. Cl. X.R.

85—5